H. Blake,

Cream Strainer.

No. 109,488.   Patented Nov. 22. 1870.

Witnesses,
Chas. F. Myers
H. A. Daniels

Harry Blake Inventor, by
Chas. S. Whitman, Attorney,

United States Patent Office.

HARRY BLAKE, OF PANAMA, NEW YORK.

Letters Patent No. 109,488, dated November 22, 1870.

IMPROVEMENT IN CREAM-STRAINERS.

The Schedule referred to in these Letters Patent and making part of the same.

*To all whom it may concern:*

Be it known that I, HARRY BLAKE, of Panama, in the county of Chautauqua and in the State of New York, have invented a new and useful Improvement in Cream-Strainers; and do hereby declare that the following description, taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to implements made use of for the purpose of straining and mixing cream preparatory to churning; and The nature thereof consists of a slightly-conical shaft operated by a crank, and provided upon its outer surface and bottom with grooves, which are both spiral and tapering, in combination with a cylindrical strainer, the periphery of which is perforated.

In the accompanying drawing which illustrates my invention and forms a part of the specification thereof, in which like parts are designated by corresponding letters—

Figure 1:
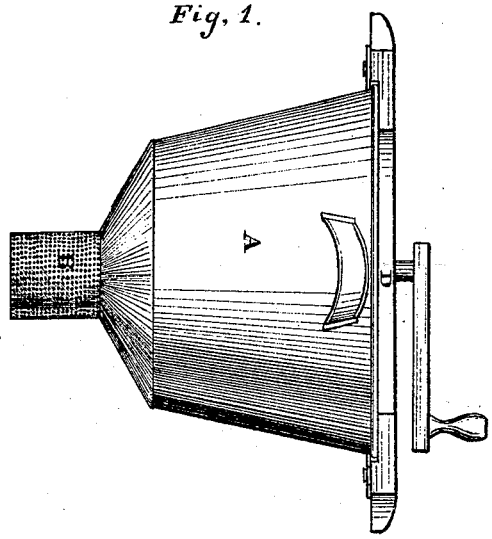
Figure 1 is a side elevation of the implement.
Figure 2:
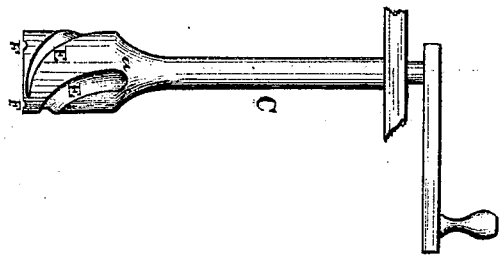
Figure 2 illustrates the shaft, provided with spiral grooves and crank.

The construction, operation, and relative arrangement of the component parts of my invention are as follows:

A represents the vessel into which the cream is poured, and the bottom of which is made convex, sloping downward toward the center, where the perforated cup or strainer B is attached to it.

The cylindrical shaft C is placed in the vessel in a vertical position, the lower end of the shaft being made large enough to fit the strainer B at the bottom, where it rests, and tapering slightly upward as far as the top of the strainer, from which point to the upper extremity the shaft is made much smaller.

The upper end is held in position by the bar D extending across the top of the vessel over the center, the shaft passing through an aperture in it, and each end of the bar being fastened to the brim of the vessel.

The lower portion of the shaft C contained by the cup or strainer B is provided with several grooves E, which commence at a point $a$ in the shaft and run downward in a spiral course, gradually diminishing in size and terminating in a horizontal direction near the bottom.

Across the bottom of the shaft, and running from the center outward, several curvilinear grooves F are also cut, which are intended to work the cream toward the perforated cylinder, the bottom of the cup or strainer being closed.

The upper end of the shaft C is provided with a crank, by which it is operated.

The machine is operated by placing it over a churn or any vessel desired. The cream is then poured in and the crank turned in the proper direction. By the operation of the shaft C and the grooves E and F the cream is forced rapidly through the strainer, with a uniform pressure against it in every direction.

Having described the construction and operation of my invention, I would state that I am aware of the patent granted to G. J. Bennett on the 9th of July, 1867, and do not claim the devices therein described.

I claim and desire to secure by Letters Patent—

The slightly-conical shaft C, provided with the tapering and spiral grooves E and F, in combination with the perforated cylinder or strainer, as and for the purposes described.

In testimony that I claim the foregoing, I have hereunto set my hand and seal this 11th day of June, 1870.

HARRY BLAKE. [L. S.]

Witnesses:
F. A. POWERS,
T. F. RANDOLPH.